Feb. 23, 1937.  H. ALLEN  2,071,375
RELIEF VALVE
Filed Jan. 23, 1932

HERBERT ALLEN.
Inventor
Jesse R. Stone
Lester B. Clark.
By
Attorneys

Patented Feb. 23, 1937

2,071,375

UNITED STATES PATENT OFFICE 2,071,375

RELIEF VALVE

Herbert Allen, Houston, Tex., assignor, by mesne assignments, to Abercrombie Pump Company, Houston, Tex., a corporation of Texas Application January 23, 1932, Serial No. 588,280

7 Claims. (Cl. 137—53)

The invention relates to an improvement in relief valves which are adapted for connection to fluid pressure lines wherein it is desired that the pressure in the line will be released when pressure in excess of a predetermined amount occurs.

It is one of the objects of the invention to provide a relief valve wherein the valve member normally remains in closed position and wherein the valve is adapted to release by shearing of a member so that the valve will move to open position.

Another object of the invention is to provide a relief valve which will move to open position by shearing of a pin and wherein a cushioning device is provided for the valve when it moves to open position.

Another object of the invention is to provide a relief valve which is arranged to release upon shearing of a pin and wherein the pin may be readily replaced from the outside of the valve member.

Other and further objects of the invention will be readily apparent to those skilled in the art when the following description is considered in connection with the accompanying drawing wherein.

Figure 1:
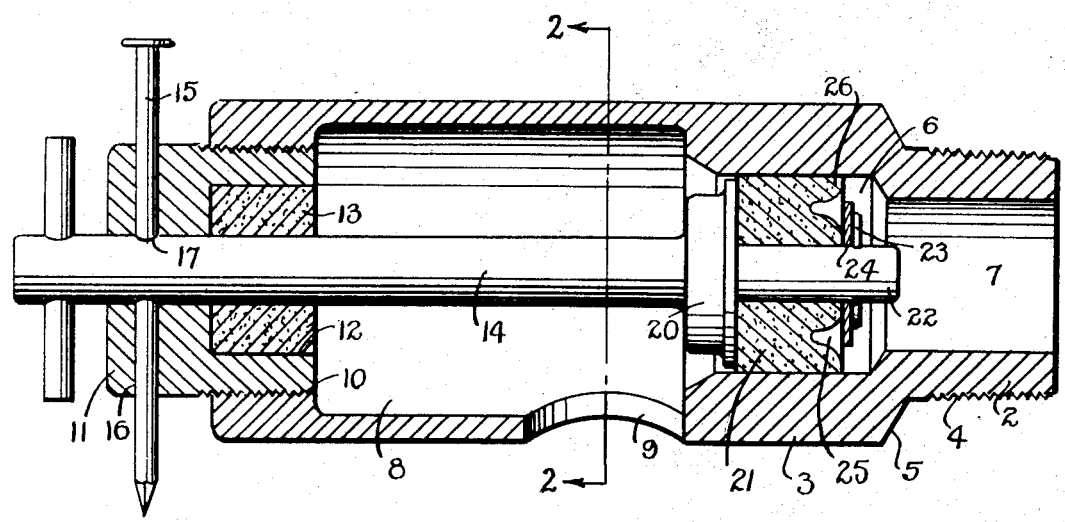
Fig. 1 is a central sectional view of the invention and showing the valve in closed position.
Figure 2:
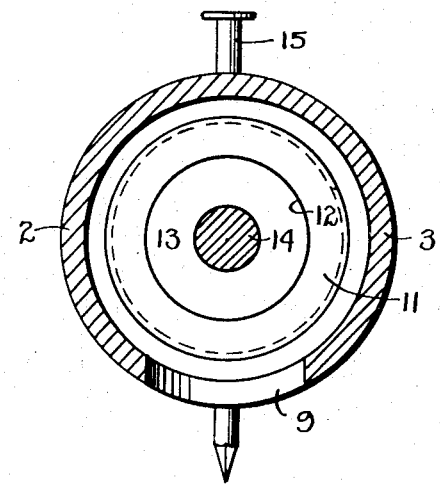
Fig. 2 is a section taken on the line 2—2 of Fig. 1 and looking in the direction of the arrows.

The invention is particularly adapted for fluid pressure lines such as steam, water, oil or gas lines, and in practice has been applied to the mud line in and around well drilling equipment. It is contemplated that a T or cross member will be placed in the line in order to provide a connection for the shank 2 of the valve body 3. The shank 2 is shown as being threaded at 4 to be fastened to the pipe line, but it is to be understood that this may be a flange connection if desired. The body 3 is enlarged at 5 to form a valve receiving chamber 6, which is in turn connected with the entrance passage 7. Beyond the valve chamber 6 is an enlarged area 8 which receives the valve when it moves to open position and which is provided with a discharge opening 9. This opening may lead directly to the atmosphere or it may have connected thereto a suitable discharge line or pipe.

The end of the valve housing 3 is provided with a threaded opening 10, which receives the plug 11. This plug is cut out as at 12 in order to receive the resilient cushioning member 13. Passing through the plug 11 and the cushioning member 13 is the valve stem 14. This stem is held in position by a shear pin 15, which passes through the lateral opening 16 in the plug 11 and through a similar opening 17 in the valve stem. Thus to position the valve as shown in Fig. 1 it is necessary to move the stem 14 inwardly and to pass the pin 15 therethrough.

It should be noted that the pin 15 is illustrated as being an ordinary nail such as is available in and around construction operations. Thus, in event the valve blows out to relieve the pressure, the valve may be renewed by inserting any nail which is available so long as it is of proper size to serve as a shear pin.

The inner end of the stem 14 carries the valve member which is adapted to close the valve chamber 6 under normal pressures. This valve member is of special construction and includes a flange 20 which may or may not be formed integral with the valve stem 14. The flange 20 serves as a backing for the resilient sealing or packing ring 21 of the valve member. This ring is formed with a central opening so that it may be passed over the projection 22, which is a part of the valve stem 14. The projection is provided with an opening to receive a locking pin 23 which may overlie a washer or ring 24. In this manner the packing ring 21 is readily replaceable with a minimum of effort. Removal of the cap 11 allows positioning of the valve in the housing.

The sealing ring 21 may be formed with an annular groove 25, so that the pressure entering the chamber 6 will tend to expand the outer lip 26 against the side of the chamber and increase the seal thus obtained. Thus the ring need not seat on a shoulder but will seal in proportion to the pressure applied.

Under normal working conditions the parts are in the position shown in Fig. 1. However, when the pressure in the line increases to a predetermined amount upon the inner face of the valve member it is apparent that the pin 15 will be sheared and the pressure will then move the valve stem 14 to the left, as viewed in Fig. 1. The pressure at which the valve is to release will be the pressure on the exposed area of the valve and the shearing strength of the pin which is used is in proportion to the pressure which will be resisted by the valve.

Thus the valve may be made up in different sizes or valves of the same size with different size shear pins, without departing from the spirit of the invention.

When the pin 15 is sheared it seems obvious that the valve stem 14 and the valve will move sharply to open position. In order to absorb the shock caused upon stopping of the valve member the cushion device 13 has been provided and the flange 20 on the valve member is of such diameter that it will pass into the opening 12 if the valve is moving at such a velocity that it will cause compression of the cushioning device 13. In this manner damage to the valve or the valve housing is avoided and the only part which need be replaced in renewing the valve is the shear pin 15.

One of the features of advantage of the present relief valve is the fact that the valve stem 14, the flange 20 and the projection 22 on the valve member do not come in contact with the housing or valve chamber. As seen in the drawing, the packing ring 21, which is of resilient material, is the only part of the valve which comes in contact with the walls of the valve chamber. In the use of valves of this type it is not uncommon for the valve to remain inactive for considerable periods of time and with other types of valves where there is a metal to metal contact of the valve with the housing, the parts become corroded and it is practically impossible for the parts to be released by the pressure encountered. When an emergency arises the valve fails to release and material damage results. With the present valve, however, the only parts which can become corroded or adhere together are the packing member 21 and the wall of the housing. The valve stem 14, however, is carried by the resilient packing member and in event the valve remains inactive for a considerable time and the packing member adheres to the wall of the housing, the valve then releases itself upon excessive pressure because the pressure would be exerted on the exposed end of the packing member and the washer 24. If this pressure were in excess of that normally intended the resilient packing member would move under this pressure and carry with it the valve stem 14. This movement would be possible even though the periphery of the packing member were corroded to the housing. The member is of rubber or other resilient material, and would move under pressure sufficiently to move the valve stem 14 and cause shearing of the pin 15 without having the periphery of the packing member move with respect to the housing. Of course, when the pin 15 is sheared the entire valve member would move back and the packing member 21 would pull loose from its contact with the housing or, in event of excessive pressure, the packing member might be destroyed by being torn apart. In any event the valve would release under any conditions encountered because there would be no metal to metal corrosion of the parts.

While one form of the invention has been shown and described it is to be understood that the invention may assume different configurations without departing from the spirit of the invention which contemplates a simple and economical relief valve structure.

What I claim as new is:

1. A shear relief valve including a housing, a passage through said housing, a valve including a sealing member closing said passage, a valve stem extending externally of said housing, said sealing member being adapted to flex to allow movement of said stem, a pin passing through said housing and stem and adapted to be sheared, which pin normally retains said valve in closed position, and means in said housing against which the valve may abut to absorb the shock of opening of said valve.

2. A relief valve including a cylindrical valve seat, a resilient sealing member therein, a stem carried by said member, a shear pin normally restraining movement of said stem, said sealing member being adapted to permit movement of said stem to shear said pin before releasing from said valve seat.

3. A relief valve having a stem, a shear pin holding said stem, a flexible packing on said stem engaging a valve seat, said stem being movable due to the flexibility of said packing sufficiently to cause shearing of said pin.

4. A relief valve including a valve seat, a packing seated therein, means carried by said packing and normally held against movement by a shear pin, said packing being flexible whereby pressure exerted thereon causes shearing of said pin before said packing is moved from said seat.

5. A relief valve including a housing having a cylindrical passage therethrough, a shear pin carried by said housing, a stem held immovable in said passage by said pin, a flexible packing mounted on said stem and disposed in said passage, the periphery of said packing seating in said passage, said stem being movable in response to pressure in said passage to shear said pin, said packing being of a length so that the pin is sheared before the seal with the housing is broken.

6. A relief valve including a housing having a cylindrical passage therethrough, a shear pin carried by said housing, a stem held immovable in said passage by said pin, a flexible packing mounted on said stem and disposed in said passage, the periphery of said packing seating in said passage, said stem being movable in response to pressure in said passage to shear said pin upon flexing of said packing so that the pin is sheared before the seal with the housing is broken, and a rubber cushion carried by said housing to absorb the shock of opening.

7. A valve construction arranged to relieve pressure above a predetermined value including means to form a seal, means to clamp and support said first means until a pressure of the predetermined value is exerted against the face of said first means, shear means to release said support at such predetermined value, said first means being yieldable upon movement of said support before the seal is broken whereby thereafter movement of said support means tends to pull said sealing means from sealing position.

HERBERT ALLEN.